US010498262B2

United States Patent
Peng et al.

(10) Patent No.: US 10,498,262 B2
(45) Date of Patent: Dec. 3, 2019

(54) MAIN DRIVE CONTROL METHOD FOR GLASS FACTORIES

(71) Applicant: CHINA TRIUMPH INTERNATIONAL ENGINEERING CO., LTD., Shanghai (CN)

(72) Inventors: Shou Peng, Shanghai (CN); Wanchun Tian, Shanghai (CN); Jianqing Wang, Shanghai (CN); Yonghui Liu, Shanghai (CN); Xiaojiang Chen, Shanghai (CN); Wei Zhang, Shanghai (CN)

(73) Assignee: CHINA TRIUMPH INTERNATIONAL ENGINEERING CO., LTD., Putuo District, Shanghai (CN)

( * ) Notice: Subject to any disclaimer, the term of this patent is extended or adjusted under 35 U.S.C. 154(b) by 0 days.

(21) Appl. No.: 15/535,046

(22) PCT Filed: Apr. 29, 2015

(86) PCT No.: PCT/CN2015/077768
§ 371 (c)(1),
(2) Date: Jun. 10, 2017

(87) PCT Pub. No.: WO2016/090820
PCT Pub. Date: Jun. 16, 2016

(65) Prior Publication Data
US 2017/0324355 A1     Nov. 9, 2017

(30) Foreign Application Priority Data

Dec. 10, 2014    (CN) .......................... 2014 1 0751846

(51) Int. Cl.
*H02P 4/00*        (2006.01)
*G05B 19/418*     (2006.01)
(Continued)

(52) U.S. Cl.
CPC .............. *H02P 4/00* (2013.01); *G05B 19/042* (2013.01); *G05B 19/41835* (2013.01);
(Continued)

(58) Field of Classification Search
CPC .......... B65H 2220/01; B65H 2511/212; B65H 2220/02; B65H 19/1821; B65H 231/51
See application file for complete search history.

(56) References Cited

U.S. PATENT DOCUMENTS 8,702,840 B1    4/2014   Friedman et al.
2009/0096408 A1*   4/2009   Kangas ................... H02P 29/00
                                                                 318/568.1

(Continued)

FOREIGN PATENT DOCUMENTS

CN        201536067 U     7/2010
CN        202260611 U     5/2012
(Continued)

*Primary Examiner* — Bickey Dhakal
*Assistant Examiner* — Zoheb S Imtiaz
(74) *Attorney, Agent, or Firm* — Global IP Services; Tianhua Gu

(57) ABSTRACT

A main drive control method for glass factories, comprising the following steps: (a) providing a first circuit breaker and a second circuit breaker on a power supply loop of an electrical motor, wherein one end thereof is respectively connected to two main drive electrical motors; (b) enabling the first circuit breaker to be connected to a municipal power supply and the second circuit breaker to be connected to a UPS power supply; and (c) enabling the first circuit breaker and the second circuit breaker to be interlocked via a mechanical interlocking mechanism, so that only one of the circuit breakers can be switched on during a normal operation. The main drive control method for glass factories
(Continued)

solves the problem that the rotation speed of a main drive electrical motor is incorrect due to the interference on a signal.

4 Claims, 7 Drawing Sheets

(51) Int. Cl.
*H02P 27/06* (2006.01)
*G05B 19/042* (2006.01)
*H02J 9/06* (2006.01)

(52) U.S. Cl.
CPC ................ *H02J 9/06* (2013.01); *H02P 27/06* (2013.01); *G05B 2219/25391* (2013.01); *Y02B 70/3241* (2013.01); *Y04S 20/227* (2013.01)

(56) References Cited

U.S. PATENT DOCUMENTS

| | | | | |
|---|---|---|---|---|
| 2010/0038966 | A1* | 2/2010 | Espeut, Jr. | H01H 9/26 307/68 |
| 2013/0028740 | A1* | 1/2013 | Koehnke | F03D 7/0224 416/147 |
| 2015/0345385 | A1* | 12/2015 | Santini | F01D 15/10 290/52 |
| 2017/0324355 | A1* | 11/2017 | Peng | H01H 9/26 |

FOREIGN PATENT DOCUMENTS

| | | |
|---|---|---|
| CN | 103064306 A | 4/2013 |
| CN | 104407531 A | 3/2015 |
| CN | 204287810 U | 4/2015 |

\* cited by examiner

MAIN DRIVE CONTROL METHOD FOR GLASS FACTORIES

CROSS REFERENCE TO RELATED PATENT APPLICATION

The present application is the US national stage of PCT/CN2015/077768 filed on Apr. 29, 2015, which claims the priority of the Chinese patent application No. 201410751846.9 filed on Dec. 10, 2014, which application is incorporated herein by reference.

FIELD OF INVENTION

This invention relates to a technical field of mechanical electric control, and particularly to a main drive control for glass factories.

DESCRIPTION OF RELATED ARTS

At present, the main drive control of most glass factories uses computer control, which mainly outputs a signal of 4~20 mA by computer analog quantity and controls a frequency of a frequency converter so as to control a rotate speed of a main drive electrical motor. This control method is easily to cause an interference on the signal of 4~20 mA, which brings inaccuracy of the rotate speed of the main drive electrical motor. Since glasswork products has developed in two directions, ultra-thick and ultra-thin, the control precision requirement of the main drive becomes increasingly demanding, so this kind of control method could not fully satisfy the control precision requirement of the main drive control for higher level glasswork products.

The main drive for the glass factory employs two electrical motors, one is for working and the other one is for hot standby. Currently, control circuits of the two main drive electrical motors are installed in one control box. When one of the two electrical motors is in fault maintenance, a mis-operation or mutual interference phenomenon easily happens and a man-made industrial accident is easily caused. Meanwhile the two main drive electrical motors are power-supplied by an individual municipal power supply or a individual UPS power supply respectively; if any one of the municipal power supply and the UPS power supply encounters a failure, the corresponding electrical motor will stop working, which can not meet the requirement that one electrical motor is for working and the other one is for hot standby.

In view of the disadvantages and requirements mentioned above, a novel practical main drive control method is designed not only to meet the accuracy requirement of the technique but also to be simply, safe and reliable.

SUMMARY OF THE PRESENT INVENTION

This invention aims to fill in blanks of the existing main drive control technique, and provides a main drive control method for glass factories.

To achieve the objects mentioned above, a main drive control method for glass factories is provide, which comprises following steps: (a) providing a first circuit breaker and a second circuit breaker on a power supply loop of an electrical motor, wherein one end of the first circuit breaker and one end of the second circuit breaker are connected to two main drive electrical motors respectively; (b) enabling the first circuit breaker to be connected to a municipal power supply and the second circuit to be connected to a UPS power supply; and (c) enabling the first circuit breaker and the second circuit breaker to be interlocked via a mechanical interlocking mechanism, so that only one of the circuit breakers can be switched on during a normal operation.

In some implementations, each main drive electrical motor is provided with a frequency converter, and an acceleration/deceleration button arranged on a digital input port of the frequency converter is used to change a frequency of the frequency converter by manipulating the acceleration/deceleration button, to enable a speed adjustment of the main drive electrical motors.

In some implementations, a signal is pulse outputted from the frequency converter to a pulse display instrument.

In some implementations, a malfunction output relay is in series with a main contactor opening loop.

In some implementations, a control loop of each of the two electrical motors is installed in a separate control box.

According to this invention, the main drive control method for glass factories overcomes rotate speed inaccuracy of a main drive electrical motor caused by signal interference, satisfies requirement that none of the electrical motors stops working if any one of the municipal power supply and UPS power supply encounters a power failure; and meanwhile arranges the two main drive control systems in separate control box respectively to avoid human error accidents during a failure or maintenance of any one of the electrical motor.

Description about subject matters of this invention is illustrated by examples accompanied with appending drawings to clarify other aspects and advantages of this invention in the following parts.

BRIEF DESCRIPTION OF THE DRAWINGS

By reference to the accompanying drawings and detailed illustration hereinafter, the above or other features and advantages can be better understood through.

DETAILED DESCRIPTION OF THE PREFERRED EMBODIMENTS

Reference to accompanying drawings, this invention will be described in more details hereinafter. However, this invention may be implemented by various different forms and should not be explained as being limited by the provided embodiments herein. To the contrary, these embodiments are provided for sufficient and complete disclosure, and enable the skilled in the art to fully understand the scope of this invention.

A main drive control method for glass factories according to an embodiment of this invention will be elaborated hereinafter.

Firstly, a power supply loop of an electrical motor is provided with a first circuit breaker and a second circuit breaker, wherein, one end of the first circuit breaker and one end of the second circuit breaker are connected to two main drive electrical motors respectively. Then, the first circuit breaker is connected to a municipal power supply and the second circuit breaker is connected to a UPS power supply.

And last, the first circuit breaker and the second circuit breaker are interlocked via a mechanical interlocking mechanism, so that only one of the two circuit breakers can be switched on during a normal operation.

Figure 1:
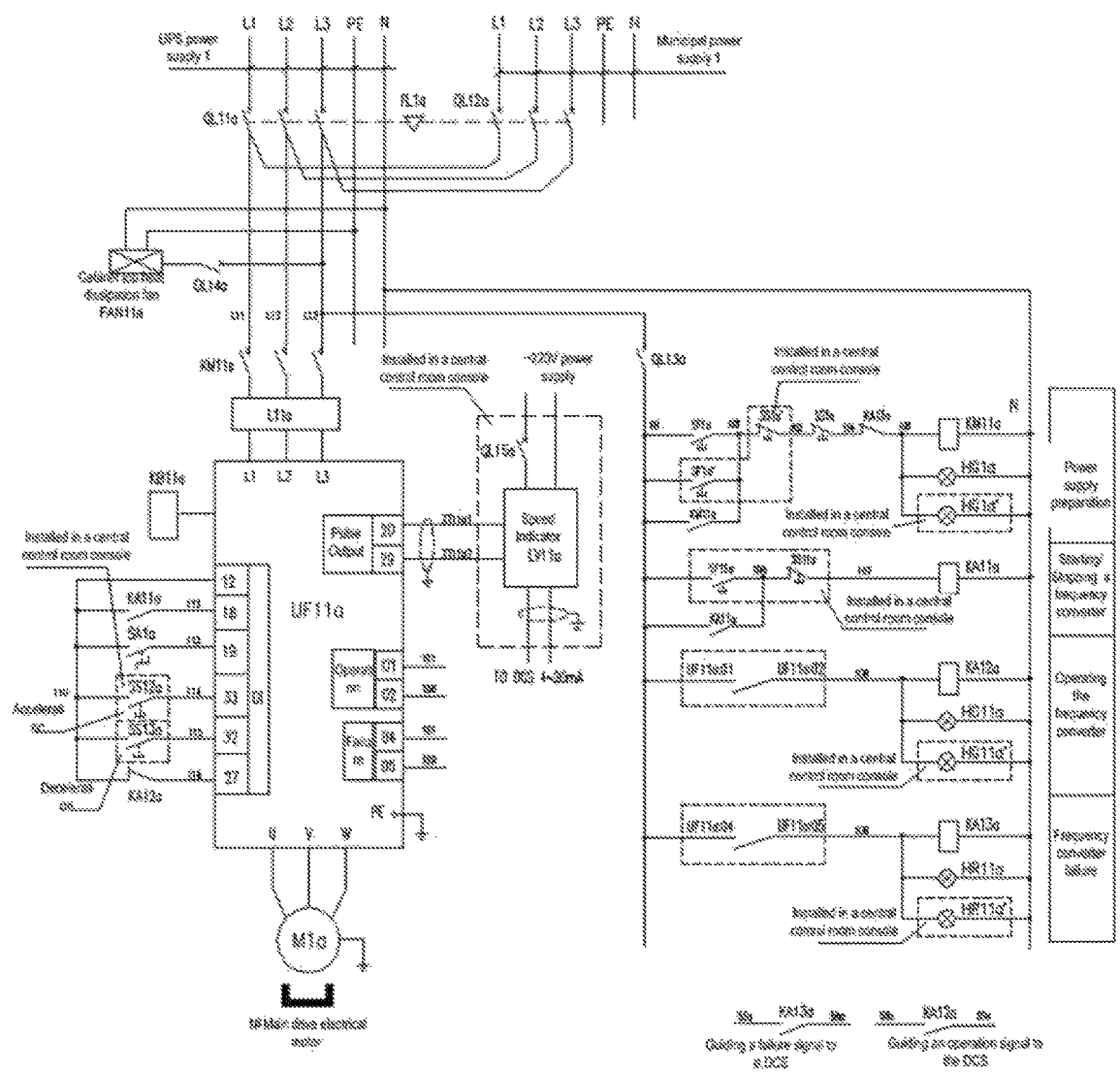
FIG. 1 is a principle diagram of 1# main drive control.
Figure 1A:
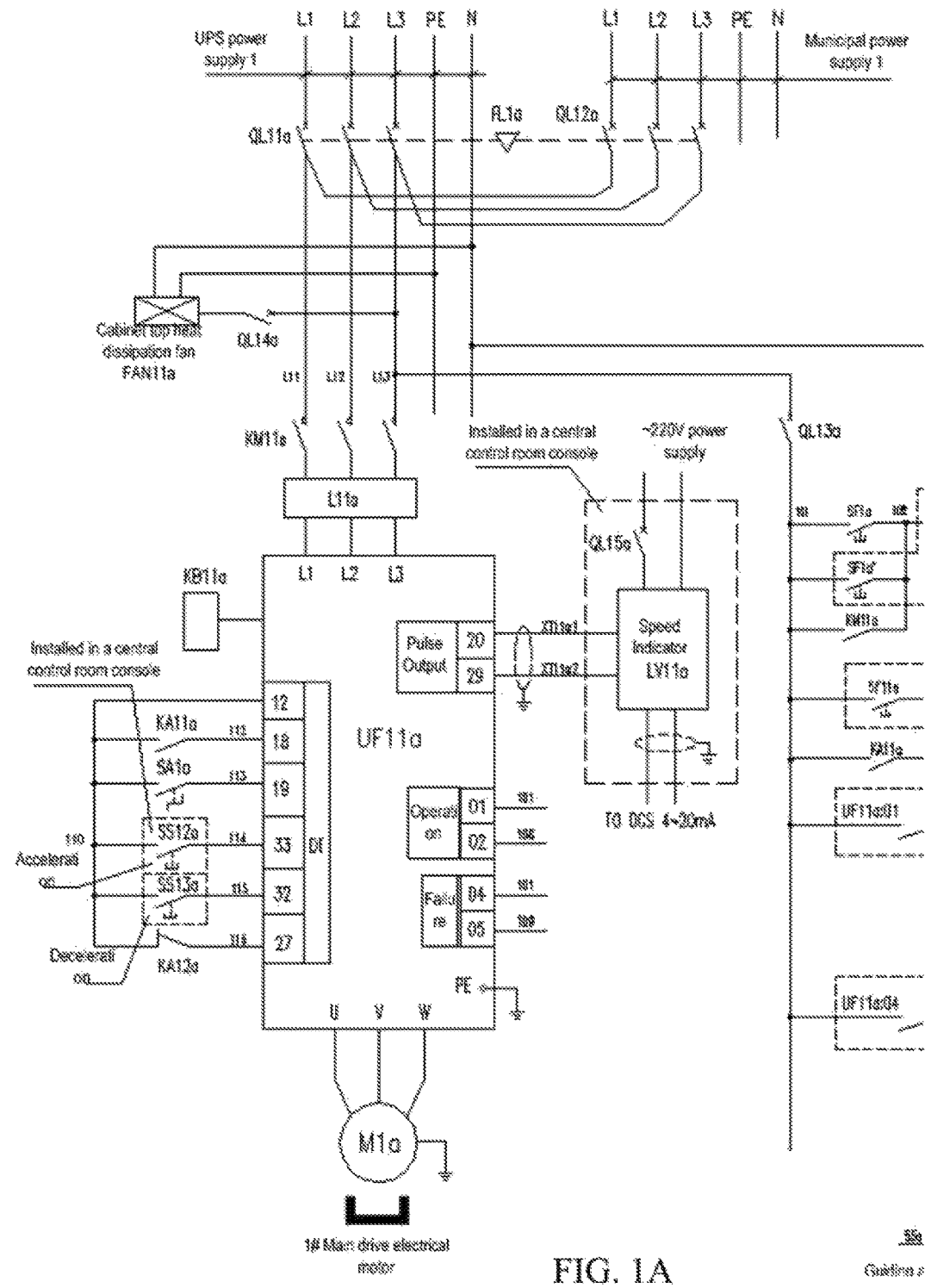
FIG. 1A is an enlarged portion of the FIG. 1.
Figure 1B:
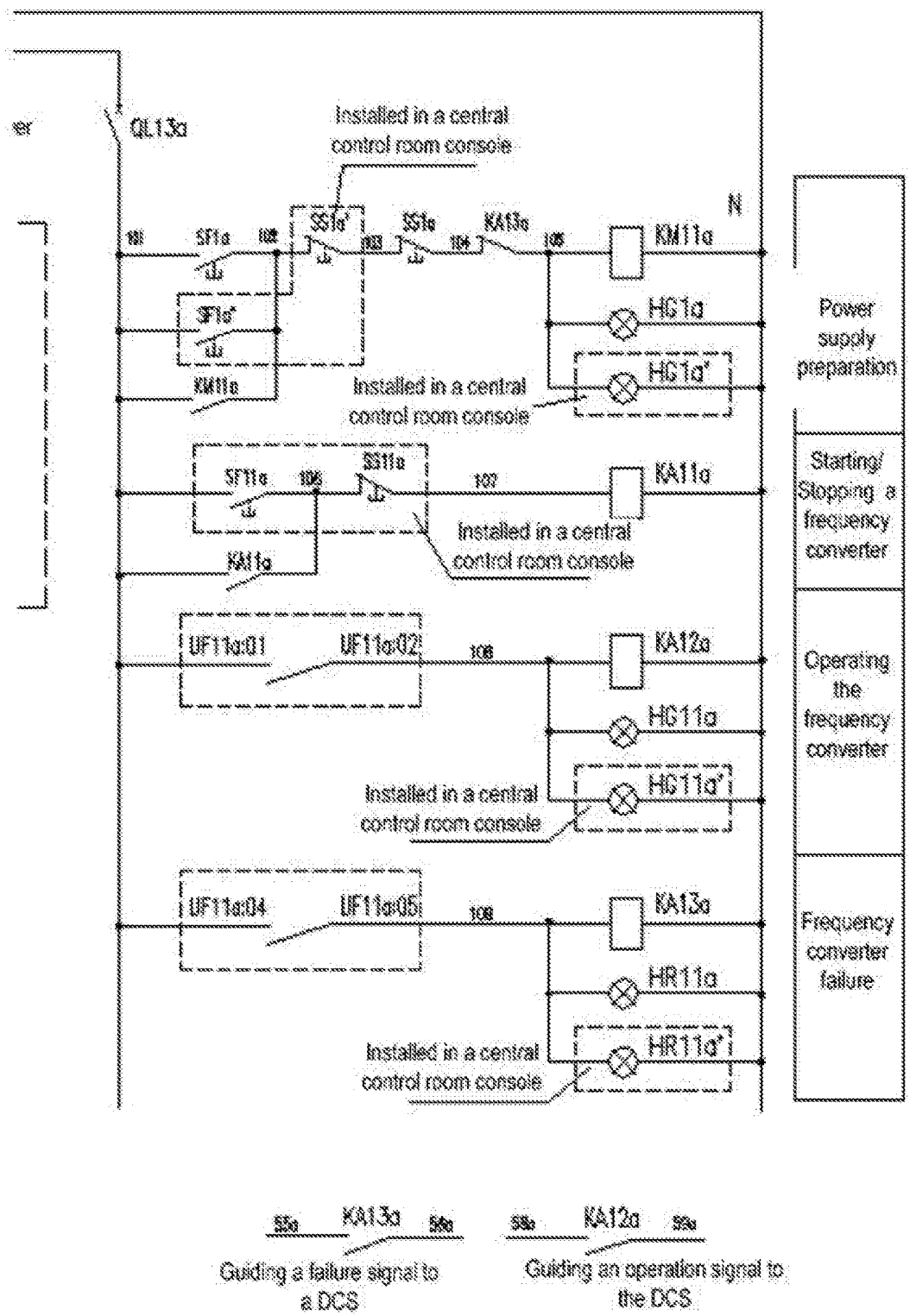
FIG. 1B is another enlarged portion of the FIG. 1.
Figure 2:
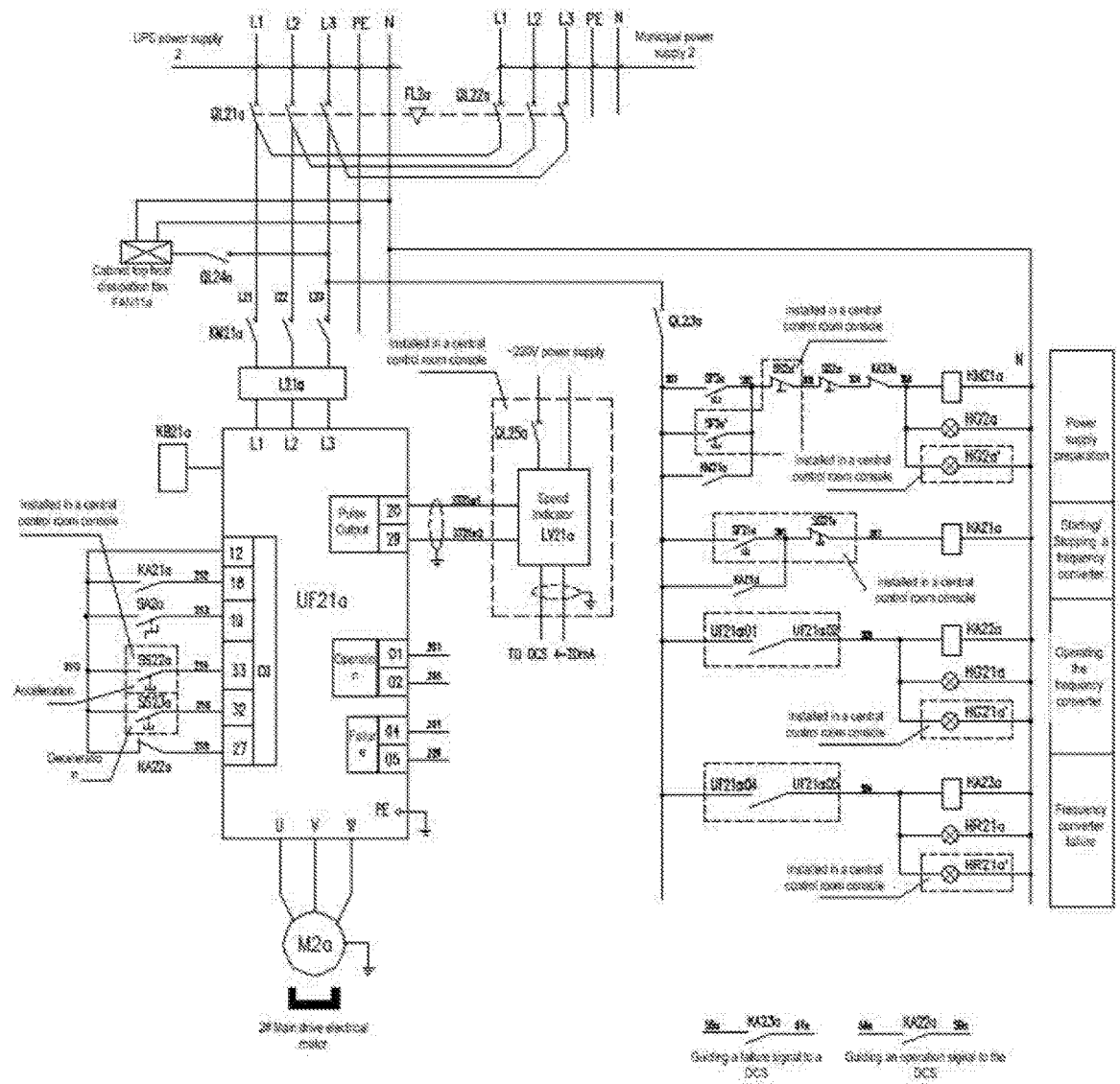
FIG. 2 is a principle diagram of 2# main drive control.
Figure 2A:
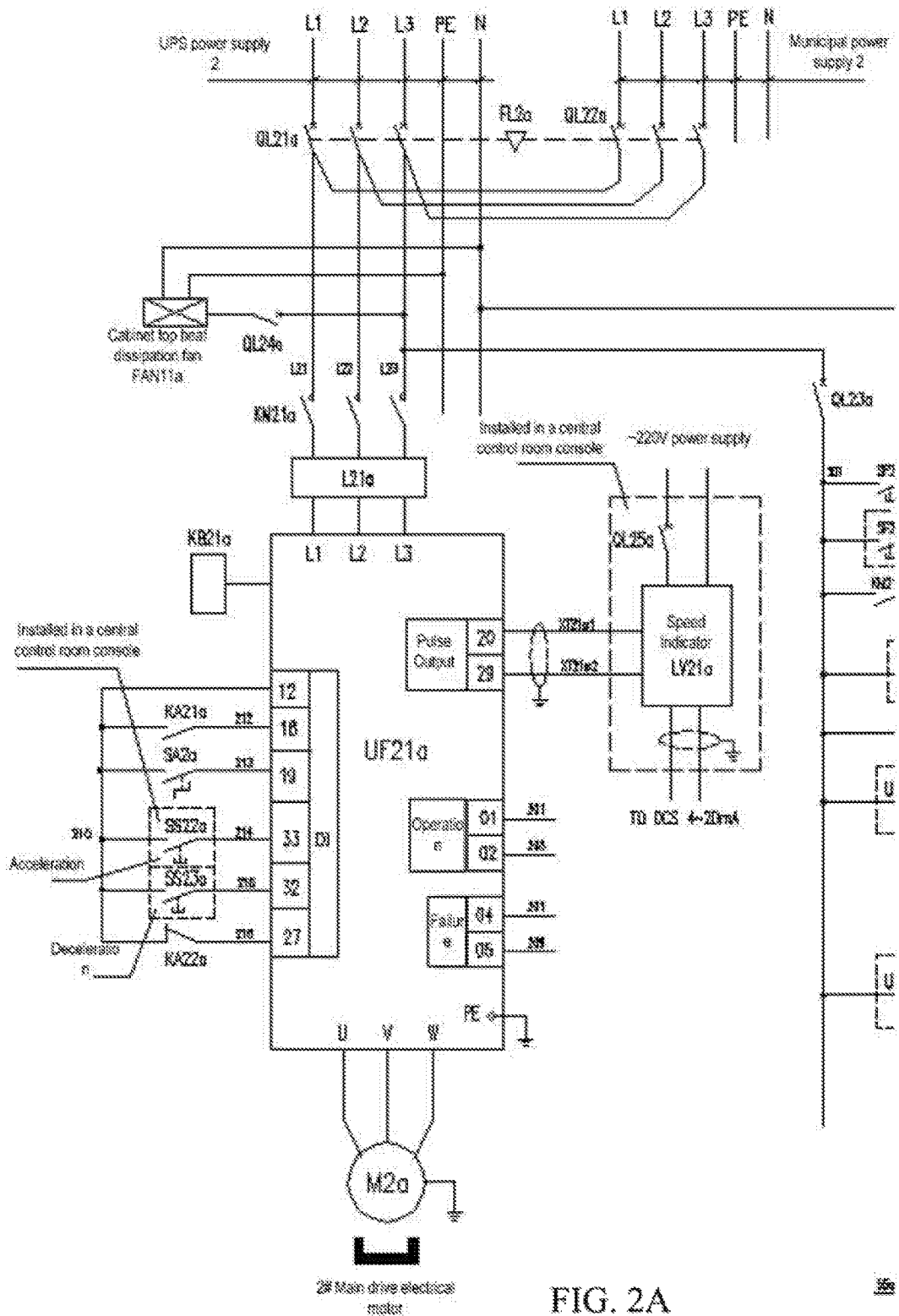
FIG. 2A is an enlarged portion of the FIG. 2.
Figure 2B:
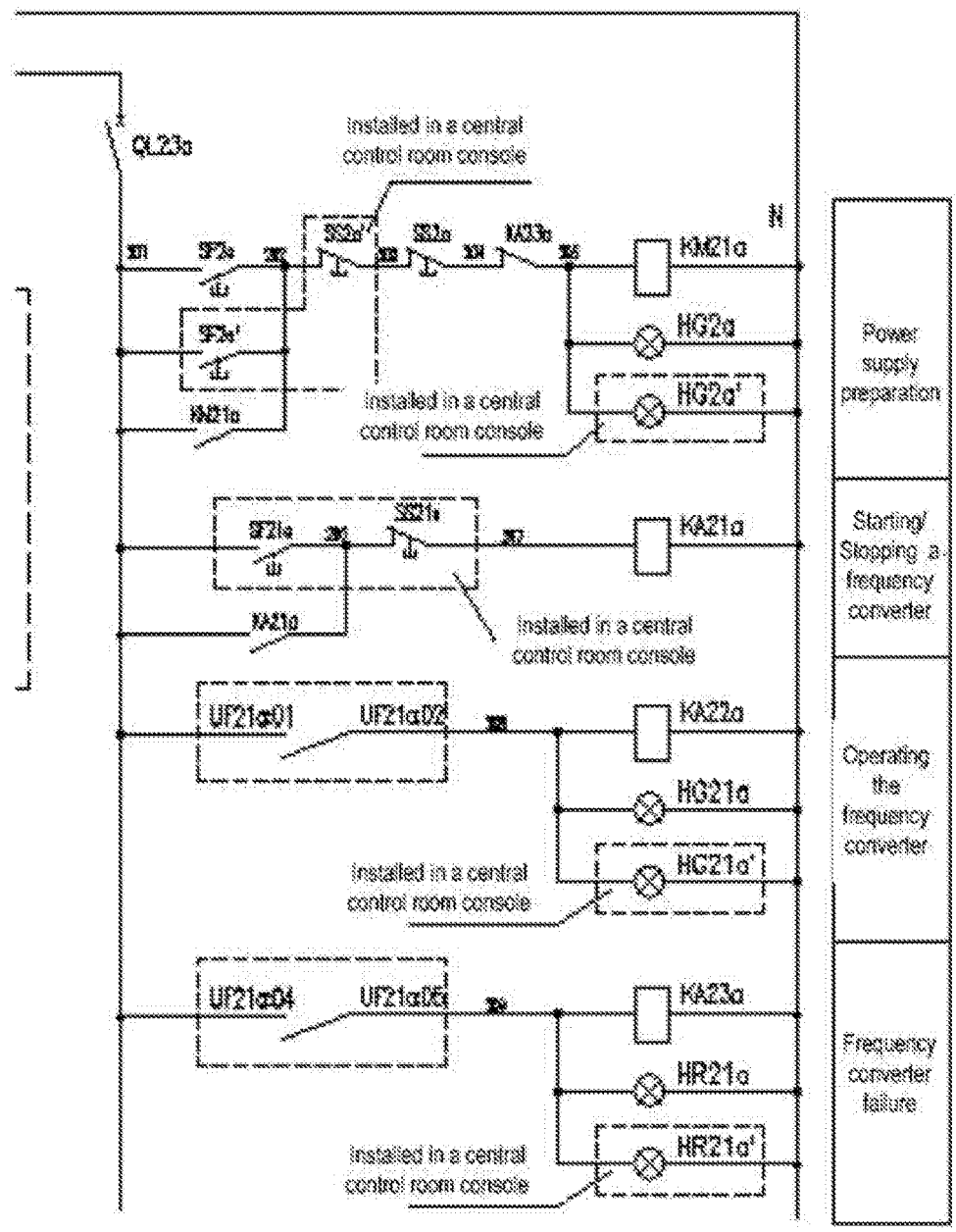
FIG. 2B is another enlarged portion of the FIG. 2.

As shown in FIG. 1, a general main drive control for a glass factory uses computer control, which mainly outputs a signal of 4~20 mA by computer analog quantity and controls a frequency of a frequency converter so as to control a rotate speed of the main drive electrical motor. This method is easily to cause an interference on the signal of 4~20 mA, which brings an inaccuracy of rotate speed of the main drive electrical motor. Meanwhile, the two main drive electrical motors are power-supplied by the municipal power supply or the UPS power supply respectively; if any one of the municipal power supply and UPS power supply encounters a failure, the corresponding electrical motor will stop working, which may not meet the requirement that one electrical motor is for working and the other one is for hot standby. Therefore this invention changes the traditional main drive control circuit, which reflects in the circuits as shown in FIG. 1 and FIG. 2.

In FIG. 1, QL11$a$ and QL12$a$ are main circuit breakers; FL1$a$ is a mechanical interlock device of the main circuit breakers; KM11$a$ is a main circuit contactor; UF11$a$ is a frequency converter; KB11$a$ is a frequency converter manipulator; L11$a$ is a frequency converter reactor; SA1$a$ is a change-over switch for remote control/body control; SS12$a$ is a manual operating acceleration button; SS13$a$ is a manual operating deceleration button; SF1$a$ and SS1$a$ are power-on and power-off manual operating buttons of the main circuit respectively; SF11$a$ and SS11$a$ are start and stop manual operating buttons of the frequency converter respectively; LV11$a$ is a velocity pulse display instrument of the main circuit; KA11$a$ is a frequency converter starting relay; KA12$a$ and KA13$a$ are a frequency converter running signal relay and a frequency converter fault signal relay respectively. In FIG. 2, QL21$a$ and QL22$a$ are main circuit breakers; FL2$a$ is a mechanical interlock device of the main circuit breakers; KM21$a$ is a main circuit contactor; UF21$a$ is a frequency converter; KB21$a$ is a frequency converter manipulator; L21$a$ is a frequency converter reactor; SA2$a$ is a change-over switch for remote control/body control; SS22$a$ is a manual operating acceleration button; SS23$a$ is a manual operating deceleration button; SF2$a$ and SS2$a$ are power-on and power-off manual operating buttons of the main circuit respectively; SF21$a$, 5521$a$ are start and stop manual operating buttons of the frequency converter respectively; LV21$a$ is a velocity pulse display instrument of the main drive; KA2l$a$ is a frequency converter starting relay; KA22$a$ and KA23$a$ are a frequency converter running signal relay and a frequency converter fault signal relay respectively.

By setting acceleration/deceleration buttons on a digital input port of the frequency converter, and by changing frequencies of the frequency converter through operations of the acceleration and deceleration buttons, an adjustment of the main electrical motor speed is implemented. By providing two circuit breakers for the power loop of each electrical motor, namely, each electrical motor is connected to two power supplies, i.e., one is the municipal power supply and the other one is the UPS power supply, while the two circuit breakers are interlocked by a mechanical interlock mechanism, only one of the two circuit breakers can be switched on during normal operations, which guarantees that both two main drive electrical motors can operate normally if any one of the two power supplies encounters a power failure. To ensure that human error accidents or interference phenomenon will not be caused by a failure or maintenance of any one of the electrical motors, two control loops of the two electrical motors are respectively arranged in separate control boxes.

To meet the requirement that both the main electrical motors could not stop working even if any one of the municipal power supply and UPS power supply encounters power failure, the power loop of each electrical motor is provided with two circuit breakers, namely, each electrical motor is connected to two power supplies, i.e., one is the municipal power supply and the other is the UPS power supply, while the two circuit breakers are interlocked by a mechanical interlock mechanism. During a normal operation, only one of the two circuit breakers can be switched on, which guarantees that both two main drive electrical motors can work properly even if one of the two power supplies encounters power failure.

To meet the precision requirement of the speed adjustment, each electrical motor of the main drive is provided with a frequency converter. By setting acceleration/deceleration buttons on the digital input port of the frequency converter, and by changing frequencies of the frequency converter through operations of the acceleration and deceleration buttons, an adjustment of the main electrical motor speed is implemented.

To directly and correctly reflect speeds of the main drive, a signal is pulse outputted from the frequency converter to a pulse display instrument to guarantee accuracy of the main drive speed.

For flexible, convenient and direct manipulation, the start/stop button of the frequency converter, the acceleration/deceleration button, an indicator, and the pulse display instrument are all arranged integrally on an operation platform of the central control room, to satisfy functions of a remote start/stop control and a speed adjustment.

To ensure cutting off the power supply in time when the frequency converter encounters a failure, a frequency converter malfunction output relay is in series with the main contactor opening loop to guarantee safety of the device and an operator when in fault.

Figure 3:
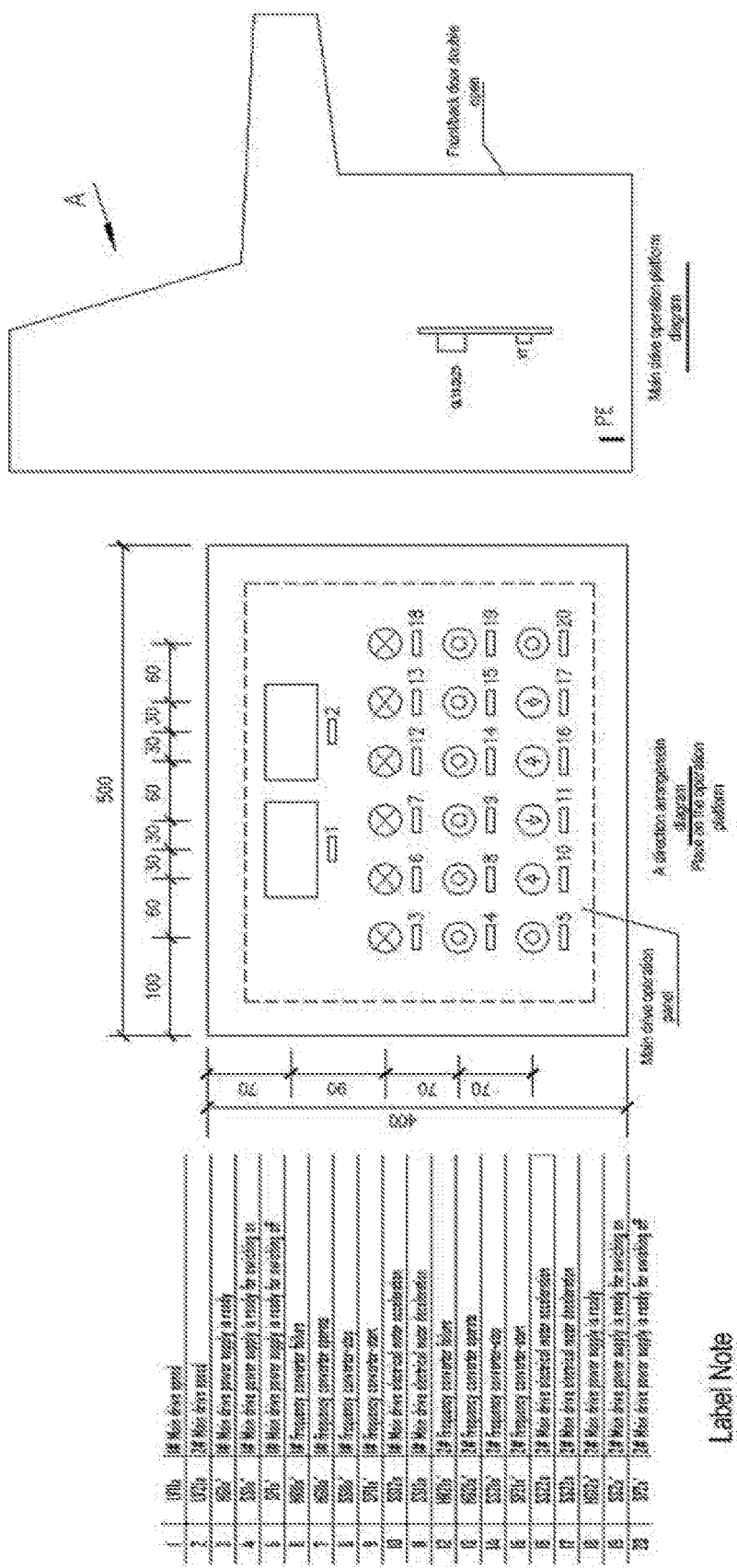
FIG. 3 is a lay-out diagram of a main drive operation platform of a central control room.

To avoid mis-operation and interference phenomenon if any one of the main drive electrical motors encounters a motor failure or maintenance, the control loop of each main electrical motor is set in separate control box respectively, as shown in FIG. 3.

The control method is implemented by following steps: (what mentioned below is for 1# main drive; 2# main drive is the same as 1#)

(1) Checking rotation direction of each electrical motor of the main drive to ensure that each electrical motor has correct rotation direction so as to meet process requirement; checking phase sequence consistency of the two power supplies in the control boxes so as to ensure that the phase sequences of the two power supplies are consistent.

(2) During the normal operation, switching the change-over switch SA1$a$ to a remote control position, manually operating the main circuit breaker switch QL11$a$ or OL12$a$ on, manually operating to switch the button SF1$a$ on, switching on the main contactor KM11$a$, and then the main circuit being power on.
  a. Setting a corresponding frequency of the frequency converter based on a speed given by the technique, manually operating to switch the start button SF11$a$ on, starting the main drive electrical motor, and then turning to the normal operation.

b. If the speed of the main drive needs to be increased, manually inching the control button SS12a to accelerate the motor; observing the display instrument LV11a, and stopping acceleration when a target value is reached.

c. If the speed of the main drive needs to be decreased, manually inching the control button SS13a to decelerate the motor; observing the display instrument LV11a, and stopping deceleration when a target value is reached.

d. If the main drive needs to stop, manually operating the stop button SS11a to complete the stop.

e. When the frequency converter works properly or encounters a failure, sending a operation or failure signal to the central control room for displaying on a computer system.

(3) Body start/stop the main drive electrical motor: switching the change-over switch SA1a to a body control position, starting/stopping the main drive electrical motor by the frequency converter manipulator, and enabling speed adjustments of the main drive through frequencies set by the frequency converter manipulator.

The main drive control method according to this invention overcomes inaccuracy of rotation rate of the main drive electrical motor caused by signal interference, satisfies requirement that none of the electrical motors stops working if any one of the municipal power supply and UPS power supply encounters a power failure; and meanwhile sets the two main drive control systems in separate control box respectively to avoid human error accidents caused by a failure or maintenance of any one of the electrical motors.

Preferable embodiments of this invention have been described in details above. One should understand that the skilled in the art may make various modifications and changes according to the spirit of this invention without any creative work. All technical schemes achieved through logical analysis, deduction or a limited number of experiments based on existing technique by the skilled in the art shall be contained in the protection scope determined by the appending claims.

What is claimed is:

1. A main drive control method with precise transmission and high reliability for glass factories, comprising: a) providing a first driving motor and a second driving motor; b) providing a municipal power supply and a UPS power supply; c) providing a first circuit switch for the first driving motor; wherein, when switching the first driving motor to the municipal power supply is switched on, the first driving motor to the UPS power supply is turned off, when switching the first driving motor to the UPS power supply is switched on, the first driving motor to the municipal power supply is turned off; d) providing a second circuit switch for the second driving motor; wherein, when switching the second driving motor to the municipal power supply turned on, the second driving motor to the UPS power supply is turned off; when switching the second driving motor to the UPS power supply turned on, the second driving motor to the municipal power supply is turned off, e) providing an interlocking device for the first circuit switch and second circuit switch respectively, the interlocking device has a first circuit breaker and a second circuit breaker, wherein, when the first circuit breaker is turned on the second circuit breaker is turned off, when the first circuit breaker is turned off the second circuit breaker is turned on during a normal operation, wherein, the first and second drive motors are provided with a frequency converter controlled by a computer respectively, an acceleration/deceleration button is arranged on a digital input port of each frequency converter, which is used to change a frequency of the frequency converter, to enable an manual speed adjustment for the first and second drive motors.

2. The main drive control method with precise transmission and high reliability of claim 1, wherein, a pulse signal is outputted from the frequency converter to a pulse display instrument.

3. The main drive control method with precise transmission and high reliability of claim 2, wherein, a frequency converter malfunction output relay is connected in series with a main contactor opening loop.

4. The main drive control method with precise transmission and high reliability of claim 1, wherein, the first and second driving motors have a control loop, which is installed in a control box, the two control boxes for the first and second driving motors are separated.

* * * * *